US006510469B1

(12) United States Patent
Starnes et al.

(10) Patent No.: US 6,510,469 B1
(45) Date of Patent: Jan. 21, 2003

(54) METHOD AND APPARATUS FOR PROVIDING ACCELERATED CONTENT DELIVERY OVER A NETWORK

(75) Inventors: Darrell J. Starnes, Tomball, TX (US); Amgad M. Elwahab, Houston, TX (US); Jeffrey R. Gabler, Tomball, TX (US); Steven C. Giap, Houston, TX (US); Rupali M. Kothari, Houston, TX (US); Svilen B. Pronev, Cypress, TX (US); Christopher H. Stewart, Tomball, TX (US)

(73) Assignee: Compaq Information Technologies Group,L.P., Houston, TX (US)

( * ) Notice: Subject to any disclaimer, the term of this patent is extended or adjusted under 35 U.S.C. 154(b) by 0 days.

(21) Appl. No.: 09/133,498

(22) Filed: Aug. 12, 1998

Related U.S. Application Data

(60) Provisional application No. 60/085,309, filed on May 13, 1998.

(51) Int. Cl.[7] .............................................. G06F 15/16
(52) U.S. Cl. ...................... 709/247; 709/246; 709/217; 709/203
(58) Field of Search ................................ 709/247, 246, 709/228, 217, 219, 203, 229, 201, 218; 345/473

(56) References Cited

U.S. PATENT DOCUMENTS

| 5,727,159 A | * | 3/1998 | Kikinis ........................ 709/246 |
| 5,764,235 A | * | 6/1998 | Hunt et al. .................. 345/428 |
| 5,918,013 A | * | 6/1999 | Mighdoll et al. ........... 709/217 |
| 5,996,022 A | * | 11/1999 | Krueger et al. ............. 709/247 |

OTHER PUBLICATIONS

R. Fielding et al., "Hypertext Transfer Protocol–HTTP/1.1", HTTP Working Group, Aug. 12, 1996, pp. 1–110.
"WinGate 2.1 is Officially Released", www.wingate.net, 1997.
"WinGate Opens the Internet Door", LAN Times (www-.lanstimes.com/97/97jan/701b066a.html), Jan. 1997.
"Microsoft Proxy Server 1.0", Microsoft Corporation (www.microsoft.com/products/prodref/130_ov.htm).
"Microsoft Announces Proxy Server 2.0", Microsoft Corporation (www.microsoft.com/corpinfo/press/1997/oct97/proxy2pr.htm), Oct. 8, 1997.
"Microsoft Proxy Server 2.0; What's New", Microsoft Corporation (www.microsoft.com/proxy/guide/whatsnew:asp?a=2&B=1).
Microsoft Proxy Server 2.0; Technical Papers, Cache Array Routing Protocol (CARP) Whitepaper, Microsoft Corporation (www.microsoft.com/proxy/guide/CarpWP.asp?A=2&B=3).

* cited by examiner

Primary Examiner—Glenton B. Burgess
Assistant Examiner—Abdullahi E. Salad
(74) Attorney, Agent, or Firm—Akin, Gump, Strauss, Hauer & Feld, L.L.P.

(57) ABSTRACT

Improved techniques for rapid and efficient delivery of objects from a network (e.g., the Internet) to users. The improved techniques can be utilized in a variety of apparatuses, including a proxy system or an acceleration apparatus. Such a proxy system operates to produce an accelerated version of content information from the network, cache the accelerated version (and possibly original versions) for subsequent requests for the same information content, and supply the accelerated version of the information content to a requesting user.

28 Claims, 11 Drawing Sheets

METHOD AND APPARATUS FOR PROVIDING ACCELERATED CONTENT DELIVERY OVER A NETWORK

CROSS-REFERENCE TO RELATED APPLICATIONS

This application claims the benefit of U.S. Provisional Application No. 60/085,309, entitled "METHOD AND APPARATUS FOR STORAGE AND DELIVERY OF CONTENT", and filed on May 13, 1998, the disclosure of which is incorporated herein by reference for all purposes.

This application is related to U.S. patent application Ser. No. 09/133,791, still pending, filed concurrently herewith, entitled "ACCELERATED CONTENT DELIVERY OVER A NETWORK USING REDUCED SIZE OBJECTS," and assigned to the assignee of the present application, which is hereby incorporated herein by reference for all purposes.

This application is related to U.S. patent application Ser. No. 09/133,482, now U.S. Pat. No. 6,144,996, filed concurrently herewith, entitled "METHOD AND APPARATUS FOR PROVIDING A GUARANTEED MINIMUM LEVEL OF PERFORMANCE FOR CONTENT DELIVERY OVER A NETWORK," and assigned to the assignee of the present application, which is hereby incorporated herein by reference for all purposes.

This application is also related to U.S. patent application Ser. No. 09/133,497, now U.S. Pat. No. 6,389,460, filed concurrently herewith, entitled "METHOD AND APPARATUS FOR EFFICIENT STORAGE AND RETRIEVAL OF OBJECTS IN AND FROM AN OBJECT STORAGE DEVICE," and assigned to the assignee of the present application, which is hereby incorporated herein by reference for all purposes.

This application is also related to U.S. patent application Ser. No. 09/132,952, now U.S. Pat. No. 6,300,959, filed concurrently herewith, entitled "METHOD AND SYSTEM CONDENSING ANIMATED IMAGES," and assigned to the assignee of the present application, which is hereby incorporated herein by reference for all purposes.

This application is also related to U.S. patent application Ser. No. 09/133,514, now U.S. Pat. No. 6,216,881, filed concurrently herewith, entitled "IMAGE FORMAT CONVERSION WITH TRANSPARENCY COLOR ADJUSTMENT," and assigned to the assignee of the present application, which is hereby incorporated herein by reference for all purposes.

BACKGROUND OF THE INVENTION

1. Field of the Invention

The present invention relates to information retrieval and, more particularly, to accelerated retrieval of content information over a network.

2. Description of the Related Art

The Internet is a resource for tremendous amounts of content information. As examples, the content information can include text, images or other types of data. A user normally accesses the Internet using a connection provided by a modem and a regular telephone line or ISDN line, or by a T1 line or leased line. The connection to the Internet may be indirectly through an Internet Service Provider (ISP) or more directly to the Internet (or World Wide Web). The higher the bandwidth supported by the connection, the better the responsiveness of the Internet to the user's requests. For example, since a T1 line offers substantially greater bandwidth than does a 28.8 kbps modem and regular telephone line, the connection to the Internet provided by the T1 line will provide substantially faster responsiveness to a user's requests than would the 28.8 kbps modem.

Internet proxy servers have been used to allow multiple users to share Internet access through a common high speed connection. Shared connections facilitate providing firewalls to prevent unauthorized access into the user's (e.g., corporate) internal computers. These shared connections can also provide the Hypertext Transfer Protocol (HTTP) caching to allow improved responsiveness. Examples of such Internet proxy servers are (1) WinGate available from Deerfield Communications Company and (2) Microsoft Proxy Server available from Microsoft Corporation.

HTTP caching operates to locally store frequently accessed Internet material so that it becomes quickly available when subsequently requested. HTTP caching is described in the Hypertext Transfer Protocol (HTTP), version 1.1, which is hereby incorporated by reference. Such caching enables an organization to more efficiently share the bandwidth of the Internet connection. These Internet proxy servers can also provide site filtering to prevent user (behind the Internet proxy server) access to certain Internet sites.

Content negotiation is also known and described in the HTTP, version 1.1. Content negotiation is the process in which a HTTP response to a HTTP request is chosen to be that which is most suitable, assuming of course that there is a choice. The content negotiation can be client-driven or server-driven. The content differences being negotiated can vary widely but are nevertheless stored on a content server on the Internet. As an example, the content differences could be different languages or different size images. In such a case, a client may negotiate on behalf of a user with a server to receive smaller images instead of commonly provided larger images from the server. If the server can provide the smaller images, then the user is able to receive and display the information (here, images) faster than had their been no choice or no negotiation. Thus, in some cases, the negotiation facilitates improved bandwidth utilization and responsiveness of the Internet.

One problem with the conventional approaches to content delivery over the Internet is that most content servers do not offer multiple versions of information content. As a result, content negotiation, even if available, is not supported by most content servers. There are also no standards on what types of versions or variations of information content a content server should make available. Consequently, content negotiation is difficult to obtain over the Internet.

Another problem is that while caching can improve responsiveness of the Internet to requests, it speeds only subsequent requests for the same information from a shared Internet connection. As a result, there is never any performance improvement for initial requests for information content from the Internet.

Thus, there is a need for improved techniques for rapid and efficient delivery of information content from the Internet to a user.

SUMMARY OF THE INVENTION

Broadly speaking, the invention relates to improved techniques for rapid and efficient delivery of objects from a network (e.g., the Internet) to users. The improved techniques can be utilized in a variety of apparatuses, including a proxy system or an acceleration apparatus. Such a proxy system operates to produce an accelerated version of content information from the network, cache the accelerated version (and possibly original versions) for subsequent requests for the same information content, and supply the accelerated version of the information content to a requesting user.

The invention can be implemented in numerous ways, including as a system, an apparatus, a method, or computer readable medium. Several embodiments of the invention are summarized below.

As a proxy system for distributing data objects, one embodiment of the invention includes a proxy server and an acceleration unit. The proxy server operates to receive from a network browser an object request and to manage the forwarding of the requested object to the network browser. The proxy server is also connected to a network, and the requested object is accessible by the proxy server via the network. The acceleration unit is coupled to the proxy server and is also connected to the network. The acceleration unit operates to identify the requested object, pre-fetch the requested object having an original size from a content provider coupled to the network, reduce the size of the retrieved object to a reduced size, and provide the requested object with the reduced size to the proxy server.

As a proxy system for retrieval of image files over a network, one embodiment of the invention includes an image cache memory, a proxy server and an acceleration unit. The image cache memory for storing image files that have previously been requested over the network. The proxy server operates to receive an image file request from a network browser and to manage the forwarding of the requested image file to the network browser. The acceleration unit includes at least an observer, an image manager, and an accelerator. The observer operates to identify requests for image files received by the proxy server. The image manager operates to retrieve the requested image file having an original size from the content provider via the network and to examine the requested image file to determine whether acceleration would be advisable. The accelerator operates, when acceleration has been determined to be advisable, to receive the requested image file having the original size from the image manager and then to reduce the size of the requested image file with the original size so as to produce the requested image file with the reduced size, and thereafter causing the requested image file with the reduced size to be stored to the image cache memory.

As an acceleration apparatus for producing accelerating versions of objects, an embodiment of the invention includes: an object manager and an accelerator. The object manager operates to retrieve a requested object having an original size from a remotely located computer over a network, and to examine the requested object to determine whether acceleration would be advisable. The accelerator operates when acceleration has been determined to be advisable to receive the requested object having the original size from the object manager and then to reduce the size of the requested object with the original size so as to produce the requested object with the reduced size, and thereafter causing the requested object with the reduced size to be supplied to a requestor of the requested object.

The advantages of the invention are numerous. One advantage of the invention is that substantial performance gains in responsiveness and bandwidth utilization are achieved with the invention. Another advantage of the invention is that accelerated versions of content information are produced and cached locally so that content servers need not concern themselves with offering and supporting multiple versions of the content provided on their content servers. Yet another advantage is that initial requests for content not yet cached locally may also be provided with improved responsiveness.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for rapid and efficient delivery of objects from a network (e.g., the Internet) to users. The improved techniques can be utilized in a variety of apparatuses, including a proxy system or an acceleration apparatus. Such a proxy system operates to produce an accelerated version of content information from the network, cache the accelerated version (and possibly original versions) for subsequent requests for the same information content, and supply the accelerated version of the information content to a requesting user.

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
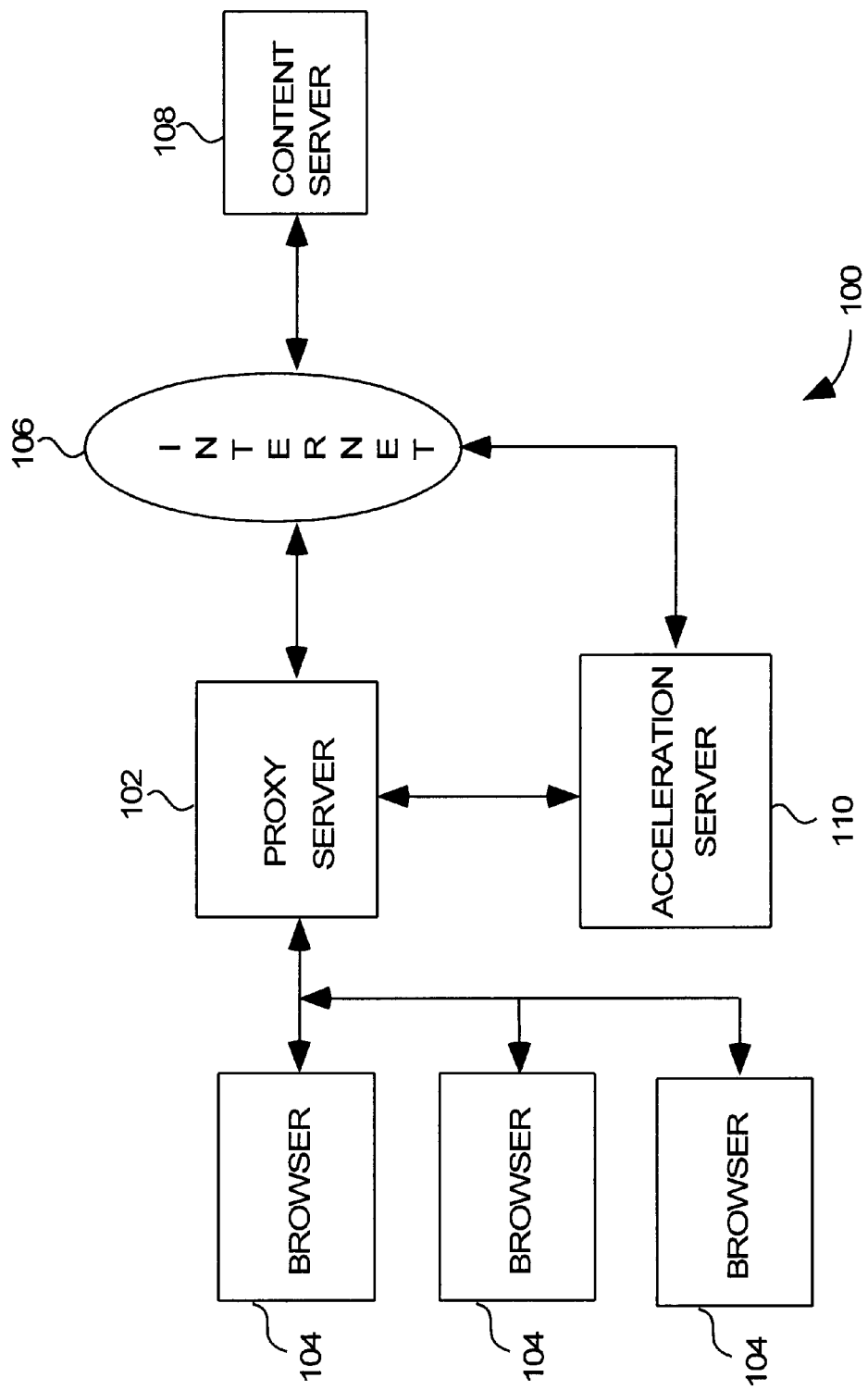
FIG. 1 is a proxy system that provides improved data delivery over a network according to an embodiment of the invention.

FIG. 1 is a proxy system 100 that provides improved data delivery over a network. The proxy system 100 includes the proxy server 102 that couples to network browsers 104. The proxy server 102 is also coupled to the Internet 106. The Internet 106 is a collection of interconnected computer systems, some of which act as content servers. Accordingly, FIG. 1 illustrates the Internet 106 coupled to a content server 108 as a representative one of the content servers associated with the Internet 106. Additionally, the proxy system 100 includes an acceleration server 110. The acceleration server 110 couples to the proxy server 102 as well as the Internet 106.

The proxy system 100 is able to provide improved content (data) delivery over the Internet 106. Namely, the proxy system 100 operates to speed up the response time that a user of one of the browsers 104 undergoes after requesting some content from the content server 108 until the requested content is supplied to the user at the one of the browsers 104.

The general operation of the proxy system 100 is as follows. Normally, as a user of one of the browsers 104 makes a request for data from a content server on the Internet 106. The proxy server 102 initially intercepts the request for data from the browser 104 and determines whether the request for data can be satisfied locally by the proxy server 102 or the acceleration server 110. When the proxy server 102 determines that the request for data cannot be satisfied locally, the proxy server 102 forwards the request for data to the content server 108 through the Internet 106. In this case, the previously intercepted request for data is passed through the proxy server 102 to the content server 108 via the Internet 106 so that the request for data can be satisfied in a conventional, unaccelerated manner.

On the other hand, when the proxy server 102 determines that the request for data can be satisfied locally with an improved response time (i.e., accelerated delivery) to the user, then the proxy server 102 and the acceleration server 110 operate to satisfy the request for data using information locally stored, thereby avoiding the need to traverse the sluggish Internet 106 and retrieve the requested data from the content server 108. Also, if the acceleration server 110 believes it can satisfy the request for data locally but the necessary information is not yet locally available, then the acceleration server 110 operates to retrieve the requested data from the content server 108 with a pre-fetch operation and then locally store the necessary information. Thereafter, the acceleration server 110 can satisfy the request for data from local storage. In either of these cases, the data returned to the browser 104 in response to the request for data will not only be locally available but also be reduced in size (e.g. reduced file size). Both of these features contribute to the ability of the proxy system 100 to significantly improve the response time in which the requested data can be delivered to the browser 104. Accordingly, the proxy server 102 acting together with the acceleration server 110 is able to accelerate the delivery of the requested data to the user of the browser 104 that has made the request.

Figure 2:
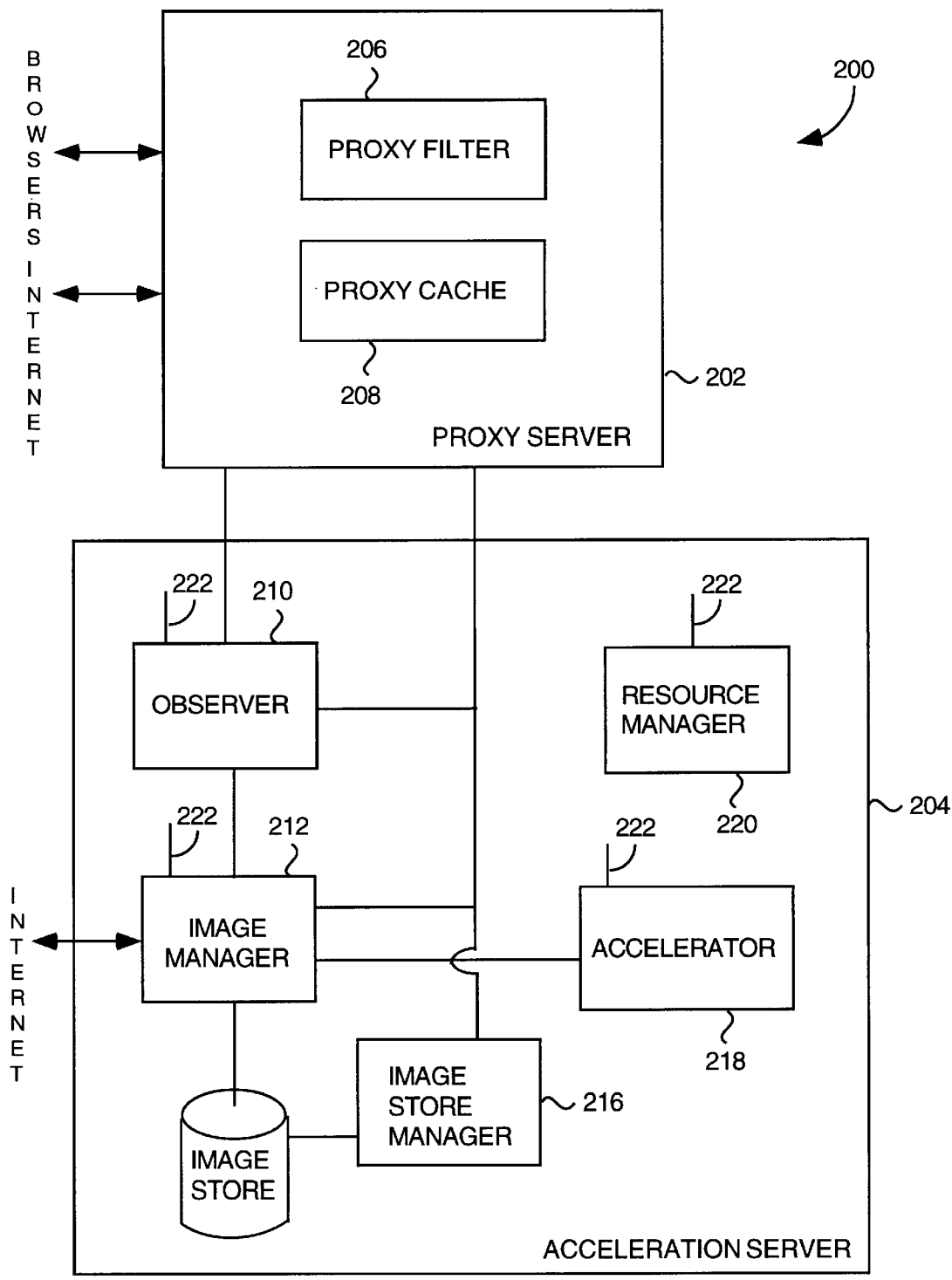
FIG. 2 is a block diagram of a proxy system according to an embodiment of the invention.

FIG. 2 is a block diagram of a proxy system 200 according to an embodiment of the invention. The proxy system 200 includes a proxy server 202 and an acceleration server 204. As an example, the proxy server 202 can correspond to the proxy server 102 illustrated in FIG. 1, and the acceleration server 204 can correspond to the acceleration server 110 in FIG. 1.

The proxy server 202 includes a proxy filter 206 and a proxy cache 208. The proxy filter 206 provides a link between the proxy server 202 and the acceleration server 204. The proxy filter 206 monitors requests for data received from the browsers 104. The proxy filter 206 then filters out those requests that it believes it can accelerate the delivery of the requested data to the user of the browsers 104. The proxy filter 206 then forwards these requests that it believes it can accelerate to the acceleration server 204. The proxy cache 208 operates as a cache storage area in which responses to earlier requests from the Internet 106 made by the browsers 104 can be temporarily saved and satisfied thereafter from the proxy cache 208 if any of the browsers 104 make the same request for data while the data remains stored in the proxy cache 208. Hence, the proxy cache 208 provides local storage for content data that was previously requested by one of the browsers 104, and thus provides rapid access to the same content data as long as the content data remains stored in the proxy cache 208. However, the content stored in the proxy cache 208 is not accelerated, but merely non-accelerated content obtained by the proxy server 202 from a content server through the Internet 106.

It should be noted that conventional proxy servers include a cache to temporarily store content obtained from a content server via the Internet. An example of such a conventional proxy server is Microsoft Proxy Server, produced by Microsoft Corporation. Hence, the proxy server 202 includes the proxy cache 208 because the proxy system 200 according to the invention can be built using a conventional proxy server suitably modified to include primarily the proxy filter 206. In other words, the proxy cache 208 need not be included in the proxy server 202 of the proxy system 200 or if provided can be disabled.

The proxy filter 206 supplies those of the data requests it believes it can accelerate to the acceleration server 204. For example, a data request (e.g., World Wide Web page request) can be evaluated to determine if it includes images. Given that images are separate files that tend to have relatively large file sizes, images are good candidates for acceleration. Hence, a data request associated with one or more image files (such as many World Wide Web pages) is an example of a data request that the proxy filter 206 would believe it could accelerate. Also, another common data request would be an image request, (e.g., GET image request in HTTP) for a particular image file from a content server via the Internet. The proxy filter 206 would also believe it could accelerate the delivery of such image files. However, in this described embodiment, before forwarding the data requests to the acceleration server for acceleration, the proxy filter 206 can check to see if the acceleration server 204 already stores the image files being requested. If so, the acceleration server 204 can provide the requested image files to the proxy filter 206 which then forwards the images to the requesting browser 104. Otherwise, the data request is sent to the acceleration server 204 for acceleration processing.

The acceleration server 204 includes various components to perform processing operations used in producing and/or supplying an accelerated response to a data request back to the proxy server 202. The major components of the acceleration server 204 are illustrated in FIG. 2 and discussed below.

An observer 210 receives a data request via the proxy filter 206. The observer 210 examines the data request to identify images associated therewith. In this embodiment, the acceleration server 204 is operating to accelerate the delivery of images to the browser 104 that make up the data request. The identified images are then forwarded to an image manager 212. The image manager 212 determines whether the desired images are already stored in an image store 214. The image manager 212 can determine those images already stored in the image store 214 using an image store manager 216. If the desired images are already stored in the image store 214, then the image manager 212 can skip the processing for the desired images because copies of the desired images were in such case obtained from the image store 214 and supplied to the proxy server 202 and then forwarded from the proxy server 202 to the requesting browser 104. On the other hand, if the image manager 212 determines that the requested images are not yet stored in the image store 214, then the images can be obtained directly from the Internet by the image manager 212 using a high speed connection. Once retrieved, the images are evaluated to determine whether they can be accelerated by an accelerator 218. If the images can be accelerated, then the accelerator 218 produces an accelerated version of the image and stores the accelerated version in the image store 214. Additionally, the image manager 212 can also store an original version of the image in the image store 214. Thereafter, the proxy server 202 can return the requested image to the requesting browser 104 in a rapid manner. When the proxy system 200 has an accelerated version of the image to return to the browser 104, the response time to the browser 104 is even further improved by the proxy system 200. Namely, the time to transmit a file (e.g., image file) from the proxy system 200 to one of the browsers 104 is proportional to file size. Therefore, given that the accelerated versions have a smaller size, the accelerated versions can be transmitted to the browsers 104 in a reduced amount of time (i.e., improved response time). Additional details on the operation of the proxy system 200 are described in detail below with respect to FIGS. 4–6D.

Although the acceleration server 204 illustrated in FIG. 2 illustrates only a single image manager 212 and a single accelerator 218, it should be recognized that the architecture of the proxy system 200 is such that a plurality of image mangers and accelerators can be provided. By being able to extend the processing capabilities of the acceleration server 204 in this manner, the proxy system 200 can scale to handle a wide range of loads by distributing the processing across the available processing resources. A resource manager 220 supplies configuration information 222 to the observer 210, the image manager 212, and the accelerator 218. In a case in which there are multiple image managers or accelerators, the resource manager 220 forwards the necessary configuration and initialization information to the image managers and accelerators.

Figure 3A:
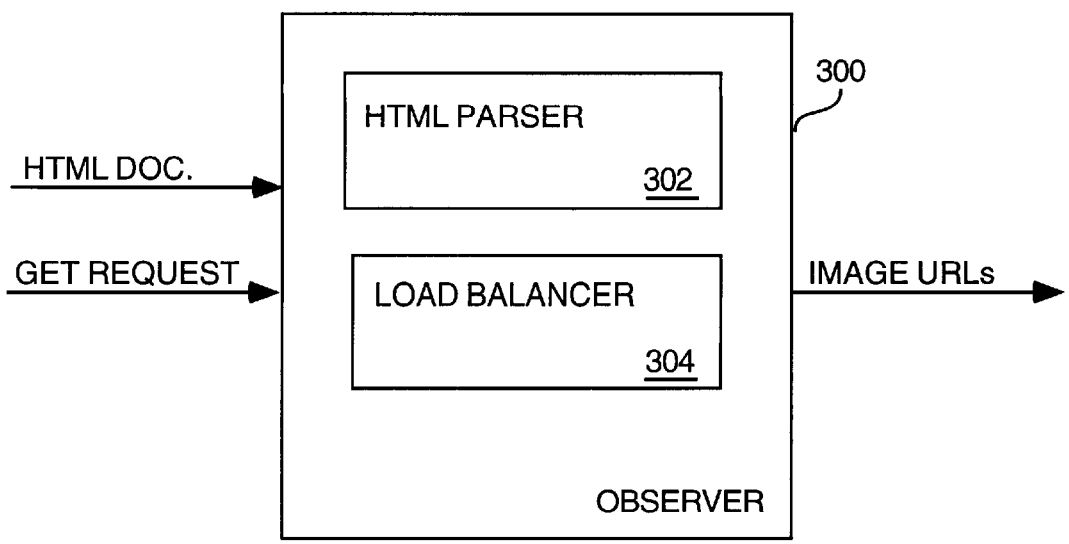
FIG. 3A is a block diagram of an observer according to an embodiment of the invention.

FIG. 3A is a block diagram of an observer 300 according to an embodiment of the invention. The observer 300 is, for example, suitable for use as the observer 210 illustrated in FIG. 2. The observer 300 includes a Hypertext Markup Language (HTML) parser 302 and a load balancer 304. The observer 300 receives an HTML document from the content server 108 by way of the proxy filter 206 of the proxy server 202. The HTML parser 302 within the observer 300 then parses the HTML document to identify image requests within the HTML document. The images within the HTML document are normally represented by files within the HTML document that can be identified by image tags or file extensions. Those identified images are then forwarded to the image manager 212 using their universal resource locators (URLs) for the images (image URLs) as well as HTTP information such as authorization information and HTTP state information (i.e., cookies). Additionally, when the observer 300 receives GET requests (for images) that are also provided to the observer 300 by the proxy filter 206 of the proxy server 202, the observer 300 forwards the image URLs associated with the GET requests as well as HTTP information to image manager 212. The load balancer 304 is optionally provided in a case in which the acceleration server 204 includes multiple image managers. In such a case, the load balancer 304 operates to forward the image URLs and HTTP information to the appropriate one of the image managers such that the load on the image managers is roughly distributed among the various active image managers in the acceleration server 204.

Figure 3B:
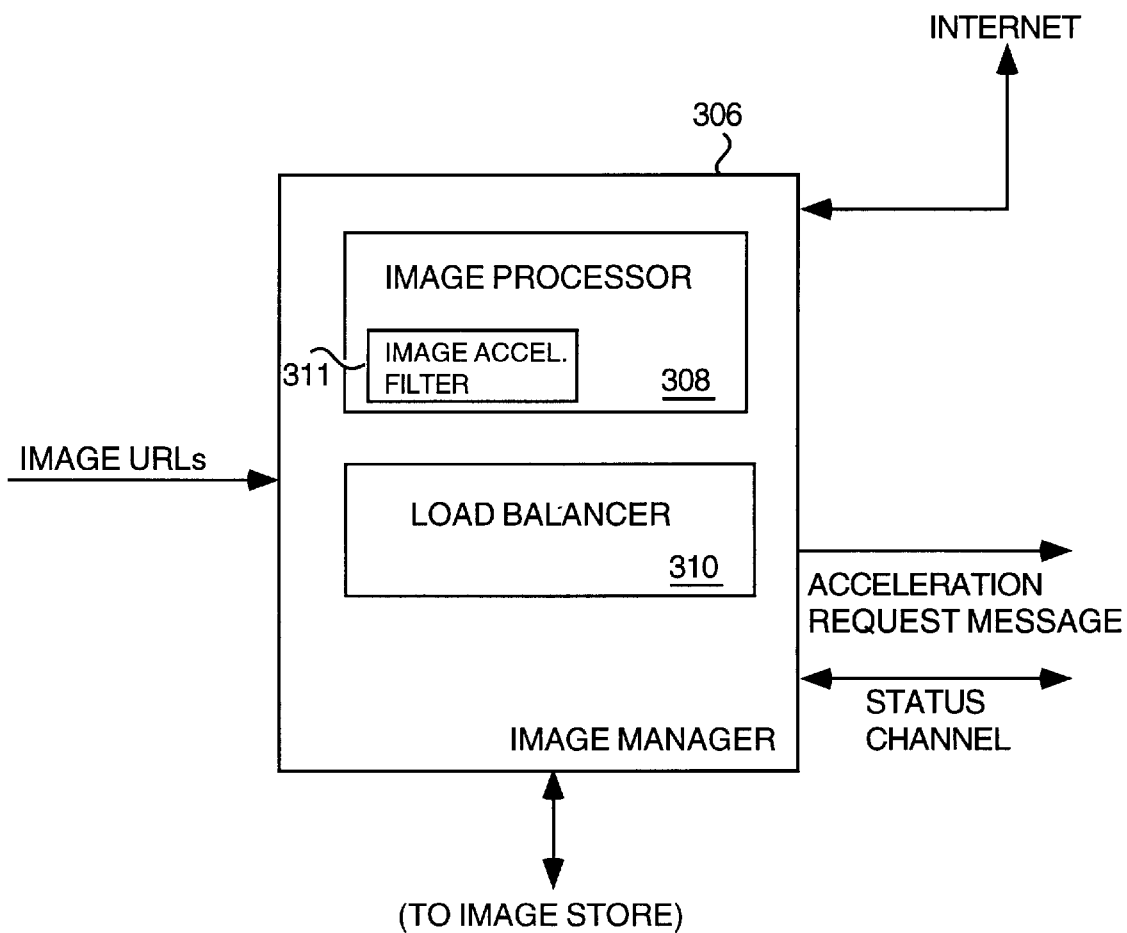
FIG. 3B is a block diagram of an image manager according to an embodiment of the invention.

FIG. 3B is a block diagram of an image manager 306 according to an embodiment of the invention. The image manager 306 is, for example, suitable for use as the image manager 212 illustrated in FIG. 2. The image manager 306 includes an image processor 308 and a load balancer 310. The image manager 306 receives incoming image URLs and the HTTP information from the observer 300 (210). The image processor 308 operates to request the images from the Internet 106.

The requesting of the images here is referred to as a pre-fetch for the images because the browser 104 has not yet made the request for the same images. More particularly, the HTML document provided by the content server 108 is obtained by the proxy server 102, 200, and the proxy server 102, 202 not only forwards the HTML document to the requesting browser 104 but also processes the HTML document in the proxy filter 206 and the observer 210, 300 to identify images. Hence, it is these identified images that can be pre-fetched by the image manager 306 before the requesting browser makes the request for the images it identifies in the HTML document. By pre-fetching the images in this manner, the invention provides a certain amount of improvement in response time to the requestor (i.e., accelerated delivery).

Once an image that has been requested by the image manager 306 is obtained, the image processor 308 determines whether an accelerated version of the image should be produced and stored in the image store 214. The image processor 308 can include an image acceleration filter 311 to determine whether producing an accelerated version of the requested image would be worthwhile. Typically, the image processor 308 will also cause the original version of the images to be stored in the image store 214. When an accelerated version of an image is to be produced, the accelerator 218 performs the processing to produce the accelerated version. In such a case, the image manager 306 will send an acceleration request message to the accelerator 218. The image manager 306 can also use a status channel to monitor and control the processing by the accelerator 218 to determine whether the processing is completing in a reasonable amount of time. Additionally, the image manager 306 includes a load balancer 310. When the acceleration server 204 includes multiple accelerators, the load balancer 310 operates to select one of the accelerators to receive a particular acceleration request message from the image manager 306. Hence, the load balancer 310 operates to distribute the processing load for producing the accelerated version of the images amongst the available accelerators.

According to the invention, an accelerator is a component of the proxy system 100, 200 which accelerates an image by reducing the amount of data required to transmit the image. The accelerator operates in conjunction with an image acceleration filter which serves to filter incoming images and accepting only those images which are candidates for successful acceleration. The image acceleration filter can be part of an accelerator, part of an image manager, or a separate component that interacts with the accelerator and the image manager. For example, in FIG. 3B, the image processor 308 is shown as including the image acceleration filter 311.

Figure 3C:
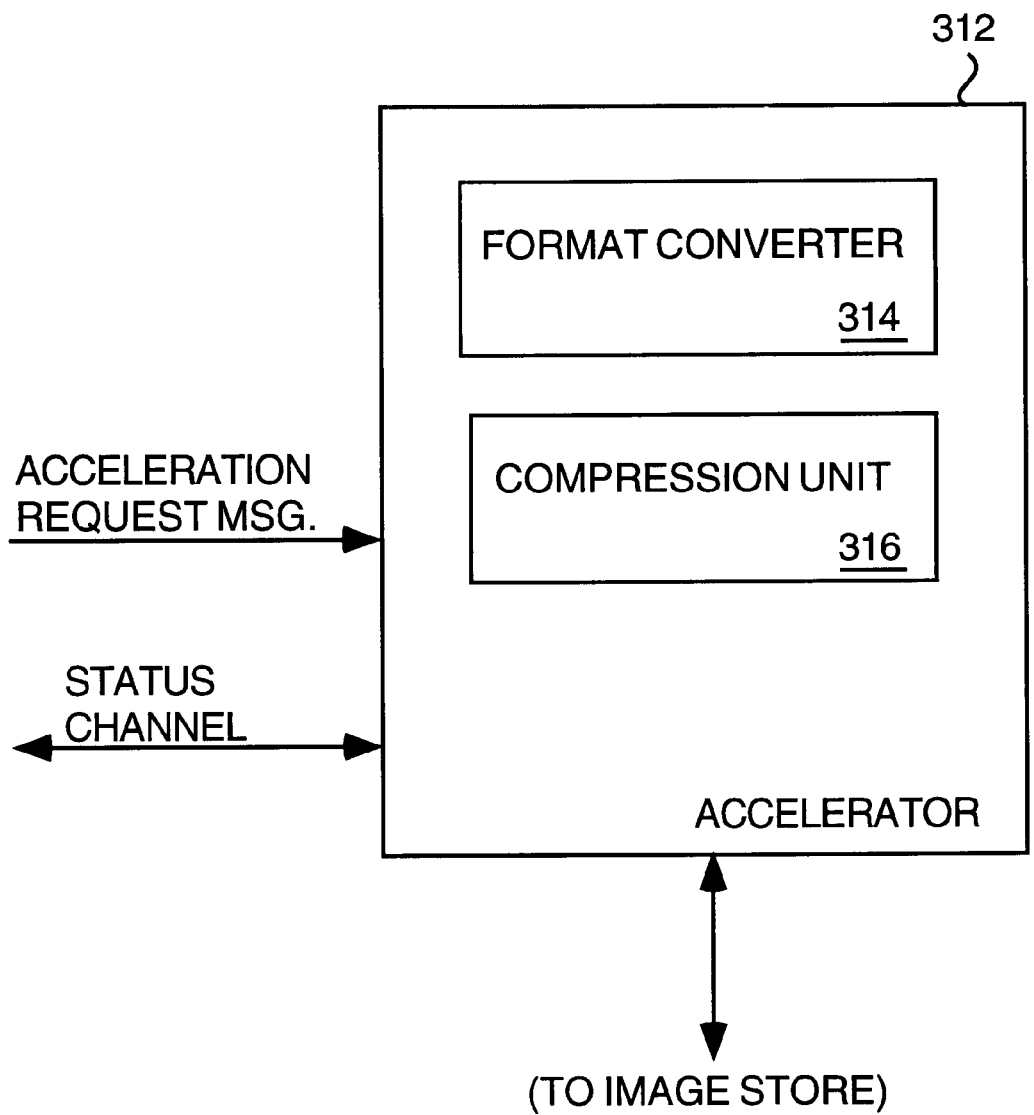
FIG. 3C is a block diagram of an accelerator according to an embodiment of the invention.

FIG. 3C is a block diagram of an accelerator 312 according to an embodiment of the invention. The accelerator 312 is, for example, suitable for use as the accelerator 218 illustrated in FIG. 2. The accelerator 312 includes a format converter 314 and a compression unit 316. The accelerator 312 receives an acceleration request message from the image manager 306. The accelerator 312 is also able to provide and exchange status and control information with the image manager 306 over the status channel.

The accelerator 312 operates to produce an accelerated version of an image that is supplied to the accelerator 312 together with the acceleration request message. In other words, once the image manager 306 retrieves (or begins retrieving) an image from the content server 108 through the Internet 106, the retrieved image is provided to the accelerator 312. The accelerator 312 then determines whether format conversion is required by the format converter 314. An example of format conversion for images, would be to convert GIF images into JPEG images as a format conversion. Such a format conversion is useful because ordinarily a JPEG image will have a smaller file size than their corresponding GIF image would. Then, following format conversion, if any, the compression unit 316 can further reduce the file size for the image using a variety of techniques. The compression unit 316, for example, could reduce image quality, size or other features so as to further reduce the file size associated with the image. In any case, the resulting image produced by the accelerator 312 is reduced in size and is referred to as the accelerated version of the image.

Alternatively, the format converter 314 and the compression unit 316 of the accelerator could operate differently. Namely, the format converter 314 can convert the various incoming image formats into a raw format, and then the compression unit 316 can reduce the file size of the images in the raw format. Thereafter, the reduced file size in the raw format can be converted back to a desired image format (e.g., JPEG). As with the other approach, the resulting accelerated versions of the images are reduced in file size and can have a format different than their original format.

In either case, the accelerated version of the image is then supplied to the image store 214 where it is stored for subsequent use by any of the requesting browsers 104 for the same image. Hence, once the accelerated version of the image is produced and stored in the image store 214, the acceleration server 204 need not reprocess a given image to produce another accelerated version until there is a request for the same image and such image is no longer present in the image store 214. In other words, the accelerated versions of the images that are produced and stored in the acceleration server 204 are reusable to satisfy subsequent requests for the same images. Generally speaking, when the image sought already has an accelerated version thereof stored in the image store 214, the pre-fetching of the image over the Internet 106 and the processing of the image to produce an accelerated version need not be performed. One might want to still perform some of such processing to produce a different accelerated version as it is possible to create, store and utilize multiple accelerated versions with different degrees of acceleration.

Additional details on the accelerator 312, observer 300, and image manager 306 are provided below.

In one embodiment, the accelerator 312 receives an image from the image manager 306, and then reduces the size of the image (e.g., compresses the image) and forwards the resulting image to the image store 214. The image reduction can be achieved by format conversion or other compression or reduction operations. Examples of such operations include: TIF to JPEG; JPEG to JPEG; transparent GIF to JPEG; animated GIF to JPEG; animated GIF to reduced animated GIF; and GIF to GIF with a reduced color set. In the case of JPEG images, the progressive JPEG format is preferably used and all JPEG files are in a JFIF format. The following JPEG compression parameters are supported: target image quality level (ranging from one to 100, with 1 being the lowest quality), and smoothing factor (ranging from 0 to 100, with 0 indicating no smoothing). Compression parameters are also provided with each image forwarded to an accelerator.

As previously noted, the accelerator operates in conjunction with the image acceleration filter. The image acceleration filter can, for example, be provided by a DLL code structure that evaluates data stored in an image buffer and determines if the image should be accelerated. The image acceleration filter can operate to perform the evaluation using the first n bytes of the image. The image acceleration filter will also build an accelerator control block (ACB) based on the original image data, a file name for storage of the resulting accelerated version, acceleration session data, an accept string, and a format control word. The acceleration session data includes, for example, quality, size, screen size, color depth, etc. The format control is set to "no control" if the image URL was embedded in an HTML page. On the other hand, the format control is set to "keep format" if the image URL is from a direct GET request. In the "keep format" situation, GIF images will only accelerate GIF images to GIFs and JPEG images to JPEGs. Otherwise, in the "no control" situation a GIF image may be accelerated to a JPEG. The ACB produced by the image acceleration filter is written to a buffer and then used by the accelerator 312.

The resource manager 220 controls the initialization and other configuration resources for the accelerator 312. In particular, in one embodiment, when an accelerator 312 is initialized, or after receiving a configuration change message, the accelerator 312 initializes with the resource manager 220. In one example, the accelerator 312 sends an initialized message to the resource manager 220, then receives back an initialized response from the resource manager 220, and thereafter sends a ready message to the resource manager 220. Also, when a configuration parameter stored in the resource manager 220 and utilized by the accelerator 312 changes, a message sequence can also occur between the accelerator 312 and the resource manager 220. In particular, once the accelerator 312 receives a configuration change message from the resource manager 220, the accelerator 312 would begin an initialization sequence as described above to re-obtain the necessary configuration information from the resource manager 220.

The communication between the image manager 306 and the accelerator 312 can also be performed with a message sequence. Whenever the image manager 306 has an image to be accelerated by the accelerator 312, the image manager 306 will send an acceleration request message to the accelerator 312. Then, the accelerator 312 will respond back to the image manager 306 with an acceleration response message. As an example, the acceleration response message can indicate acceptance, refusal or no resources. The no resources response can continue until acceleration resources have been freed and the accelerator 312 becomes able to accept additional images. At this time, the accelerator 312 notifies the image manager 212 of its available resources.

The acceleration request messages and the acceleration response messages can have a variety of formats. One suitable format having a header section and a content section is described below.

The header has the following information: ASCC" for commands, "ASCR" for responses; message type; header version number; header length; length of acceleration session data; and pointer to acceleration session data in message. The acceleration session data has the following information: quality factor (range 0–100) and smoothing factor (range 1–100, or 0 for no smoothing).

The content depends on the message type. The content of each message is described below. The content for an ACCELERATE message includes: message ID—to match commands with responses; response address—where to send accelerate image response; load balance address—where to send load balance messages; length of image data in this message; pointer to image data in this message; and name of accelerated image file—where to put accelerated image.

The content for an ACCELERATE RESPONSE message includes: message ID—same as command, and acceleration status—SUCCESS or FAIL.

The content for an ACCELERATE LOAD BALANCE RESPONSE message includes: message ID—same as command; response address—same as command; accelerator bulk address—which accelerator this message came from; length of image data in this message—same as command; pointer to image data in this message—same as command; and name of accelerated image file—same as command.

The content for a LOAD BALANCE READY message includes: server type—identifies an accelerator; server subtype—identifies accelerator subtype; server instance—instance of accelerator; server bulk message node address—where to send ACCELERATE IMAGE requests.

The configuration data provided to the accelerator 312 by the resource manager 220 can include a variety of information. One suitable format for the configuration data includes: resource manager bulk data node address; default smoothing; message node address—used to receive resource manager messages; bulk data node address—used to receive ACCELERATE messages; number of acceleration threads; animated GIF handling technique (e.g., JPEG $1^{st}$ image, optimize, or delete certain GIFs); GIF handling—JPEG or optimize; default transparent GIF color; filter process name; and accelerator process name.

The accelerator 312 can be implemented as a multi-threaded process. In one multi-threaded implementation, a main thread, an acceleration request thread, and an acceleration thread are utilized. The main thread is provided for each accelerator 312 in the proxy system 200 and operates to: contact the resource manager 220 for initialization information, creates and starts acceleration request threads, and creates and services messages on a message node. The acceleration request thread is created by the main thread and operates to: create an acceleration thread pool, create a bulk data node, service a first buffer received for an ACCELERATE request, and send the image manager 306 flow control messages (e.g., "No Resources" or "Ready"). Each of the acceleration threads within the acceleration thread pool operates to: start acceleration of an image (using the first buffer of the ACCELERATE request), receive subsequent image buffers and accelerating them, write the accelerated image to the image store 214, and notify the image manager 306 of the acceleration completion status.

The image observer 300 receives a copy of every HTML document that has been requested by user of a browser 104. The image observer 300 receives a message from the proxy filter 206 indicating whether the data request is for a HTML document or for a GET request for an image file. Either of these message types is preceded by the HTTP request and response headers. The HTTP request and response headers are used by the image manager 306 to fetch and store the image file. Each message sent by the proxy filter 206 also includes a unique ID that remains unchanged for the life of the message. The primary task of the observer 300 is as an HTML lexical analyzer. The observer 300 scans the HTML document looking for image references. The observer 300 forwards information about images it identifies to the image manager 306. The image manager 306 then confirms that these images do not already exist in the image store 214. If the image files are not in the image store 214, a slot is reserved for the resulting image file and then a request is made to obtain the image files. The image manager 306 can then attend to the retrieval of the image file from a content server, the production of an accelerated version, and its storage to the image store 214.

The observer 300 is also initialized with the help of the resource manager 220. In other words, the observer 300 obtains its configuration data from the resource manager 220. Once the observer 300 is initialized and ready to process incoming HTML documents to identify images, as each such request is received a new thread is established to perform the scanning operation. The HTML document is scanned one buffer at a time. The scanning operation looks for references to image files in the base URL if specified. The base URL is used to resolve any relative URLs. In the absence of the base URL, the document URL is used to resolve relative URLs. When the observer 300 finds a potential image file, it executes a series of checks to confirm whether the URL is for an image file. For example, one such check is to check the file extension of the potential image file. If the identified URL passes all of the checks for determining image files, then the URL and the acceleration priority are forwarded to the image manager 212. The priority of the acceleration can be determined or set in a variety of ways. For example, if the image was found in the context of a tag within the HTML document such as LOWSRC, then the priority would be set to "low", otherwise it is set to "normal". To conserve computation capabilities, low priority images can be pre-fetched by the image manager 212 but not accelerated.

Upon receiving the URL and the acceleration priority from the observer 300, the image manager 306 causes a slot (slot ID) to be reserved in the image store 214. However, if the image manager 306 determines that the image store 214 already includes the image file associated with the identified URL, then the identified URL can be ignored.

The image manager 306 can be implemented as a multi-threaded process. As such, it can coexist with other components on the same machine or can exist anywhere within a local network. Although heavy use of threads for this component can occur, threads are conserved whenever possible and threads that block on events are aborted in favor of threads blocked waiting for input/output (I/O). By using threads which block waiting for I/O, the design assumes an asynchronous state based model. If a thread is used for a unit of work, the state of the object is modified and the thread is released back to a pool to perform another unit of work. This blocking on I/O model determines the sub-component breakdown. In one embodiment, the sub-components of the image manager 306 include an image work queue, an image dispatcher, an image retriever, an image completer, and an image queue cleaner. The image work queue is, for example, a doubly linked list of information pertaining to images being processed by the image manager 306. When the image manager 306 receives an image URL from the observer 300, an element is inserted into the image work queue. After an image and its resulting accelerated version have been stored in the image store 214, the element representing the image is removed from the image work queue. The image work queue periodically operates to identify those elements representing images within the image work queue that have not been serviced by the end of some time-out period. The image queue can then validate or invalidate the associated entry in the image store 214. Thereafter, the image queue cleaner removes the associated element from the image work queue.

The image dispatcher receives image URLs that have been identified by the observer 300. For each such image URL that is provided by the observer 210, the image manager 212 dispatches an image retriever thread to process the image. The image dispatcher will also allocate an element within the image work queue for the image. Additionally, the image dispatcher is responsible for controlling the flow of data into the image manager 306. The image retriever is provided by a thread obtained from a thread pool created by the image manager 306. One image retriever thread is established for each image being processed by the image manager 306, the image retriever thread determines whether a slot for the image (i.e., for the URL of the image) already exists. If the slot already exists for the image, then no further processing of the image is performed by the image manager 306. On the other hand, when the slot for the image does not already exist, the image retriever thread creates a slot in the image store 214, retrieves the original image from the content server 108 via the Internet 106, decides based on an image acceleration filter whether the image is a suitable candidate for acceleration, places the original image in the image store 214, reserves space in the image store 214 for the accelerated version of the image, and transmits the original image to an accelerator 312 for acceleration. The image completer receives message from the accelerator 312 when an accelerated version of the image is successfully or unsuccessfully written to image store 214. At this time, the image completer can validate or invalidate the stored files in the image store 214. The image completer will also remove the associated element pertaining to the image that has been completed from the image work queue.

The load balancers provided in certain of the components of the proxy system are optional. Namely, the observer 300 can include the load balancer 304, and the image manager 306 can include the load balancer 310. The load balancers are provided to enable a component to communicate efficiently with multiple instances of another component and to load balance the computational and operational processing amongst them.

The communication between the components of the acceleration server 204 according to the invention, namely, the observer 300, the image manager 306 and the accelerator 312, can be handled by a communication manager in one embodiment of the invention. The communication manager can use a client-server architecture with message passing techniques between client components and server components. During initialization, a client component creates a connection to each server component via the communications manager. The communications manager returns a link object for each of the server connections. The client can then creates a link_group object via the load balancer associated with the client component. The client component then adds each server_link object to the link_group object that should be load balanced together. The load balancer creates a circular service queue containing an element for each server_link object and a single load balance control thread. The load balancer also overloads each send method within the server_link object of the communications manager.

When a client component wishes to send a message, it calls the same send method that is provided by the communications manager link object but referenced from the link_group object. Reads are accomplished by using the original link objects since the load balancer is working from client to server only so it does not support reads. The load balancer send method chooses the current server_link object from the service queue and delivers the message using the link object's corresponding send method to send the message to the server component. The current server_link object is set to the next server link in the service queue that is in a ready state. Note here that the send occurs in the context of the client component's thread. If the message send fails, the load balancer thread chooses the next server component in the service queue that is ready.

If a server component receives a message but cannot act on the message in a reasonable amount of time due to congestion at the server component or some error condition, the server dispatcher should return the message to the load balancer at a flow control port via a "LB Return Message" method. The Return Message method is a public method of the link_group object that can be called without creating a link_group object. The Return Message method, checks the message to see if it was sent by a load balancer. If so, it is sent to the LB control thread node contained in the message. Use of the Return Message method is not required if the server component implements the very simple actions itself.

The LB control thread re-sends the message to another server_link object in the service queue and marks the flow controlled Service Link as "Not Read". When the congestion at the server component has been alleviated it sends a "Ready" message to the flow control node. This can be accomplished by calling the public method "LB Send Ready Message" or send the appropriately formatted message to the load balancer. Upon receipt of a "Ready" message the load balancer begins to transmit messages to the server component once again.

A server component once congested should return all pending messages that cannot be serviced to the load balancer for re-transmission to another server component. The server component should not return the "Ready" message to the load balancer unless some number of messages can be accepted and acted upon. This is to avoid thrashing in the load balancer and unnecessary re-transmission of messages.

In the special case where there is only one server component, flow controlled messages are held by the load balancer until a "Ready" message is received or a configured time-out has occurred. If a time-out occurs the message is simply discarded. The client component should also keep a timer on work requests sent to the server component and take the appropriate error recovery action. Once the single server component has returned a flow controlled message, the load balancer responds to send methods with a "Server Component not Ready" return code.

The resource manager 220 is the central resource for configuration information for the proxy system 200. The various components of the acceleration server 204 obtain configuration information as well as discover and reserve other components within the acceleration server 204 using the resource manager 220. In one embodiment, the resource manager 220 makes configuration information available as strings and leaves it to the individual components to understand the strings.

Figure 4:
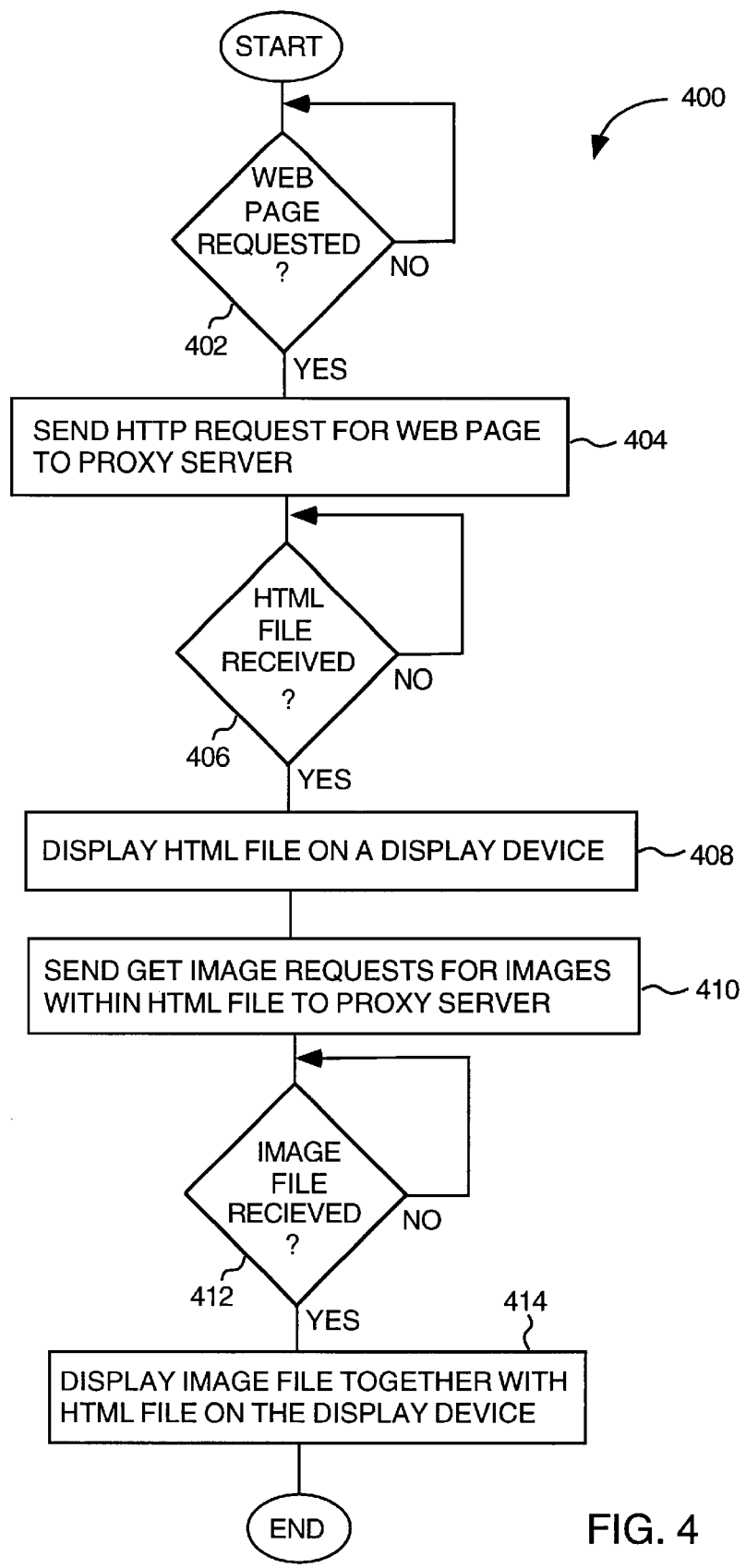
FIG. 4 is a flow diagram of browser processing according to an embodiment of the invention.

FIG. 4 is a flow diagram of browser processing 400 according to an embodiment of the invention. The browser processing 400 is typically performed by a browser, namely an Internet browser, such as the browsers 104 illustrated in FIG. 1.

The browser processing 400 initially begins with a decision block 402 that determines whether a web page request (e.g., WWW page request) has been received. The decision block 402 causes the browser processing 400 to wait until it receives such a page request. Hence, once a web page request has been received, the browser processing 400 continues.

After a web page request has been received, a HTTP request for the web page is sent 404 to a proxy server. Then, a decision block 406 determines whether an HTML file has been received. Here, the decision block 406 is waiting the return of the HTML file that is associated with the HTTP request. Once the HTML file is received, the browser processing 400 continues.

When the browser processing 400 continues, the HTML file that has been received is displayed 408 on a display device. The display device is a monitor on which information for a user of the browser is displayed. Next, the browser operates to send 410 get image requests for images within the HTML file to the proxy server. In other words, a HTML file associated with the web page typically includes embedded requests for images that make up portions of the web page. Hence, in block 410, the browser operates to send get image requests for each of the images within the HTML file to the proxy server.

Next, a decision block 412 determines whether an image file has been received in response to the get image request. If an image file has not yet been received, the decision block 412 causes the browser processing 400 to await its reception. Once the image file has been received, the image file together with the HTML file are displayed 414 on the display device. Following block 414, the browser processing 400 is complete and ends. However, it should be recognized that as soon as the browser makes another request for a web page, the browser processing 400 will again resume from the beginning. Also, it should be understood that when multiple get image requests are sent in block 410, blocks 412 and 414 are repeated for each of the images as they are received.

Figure 5A:
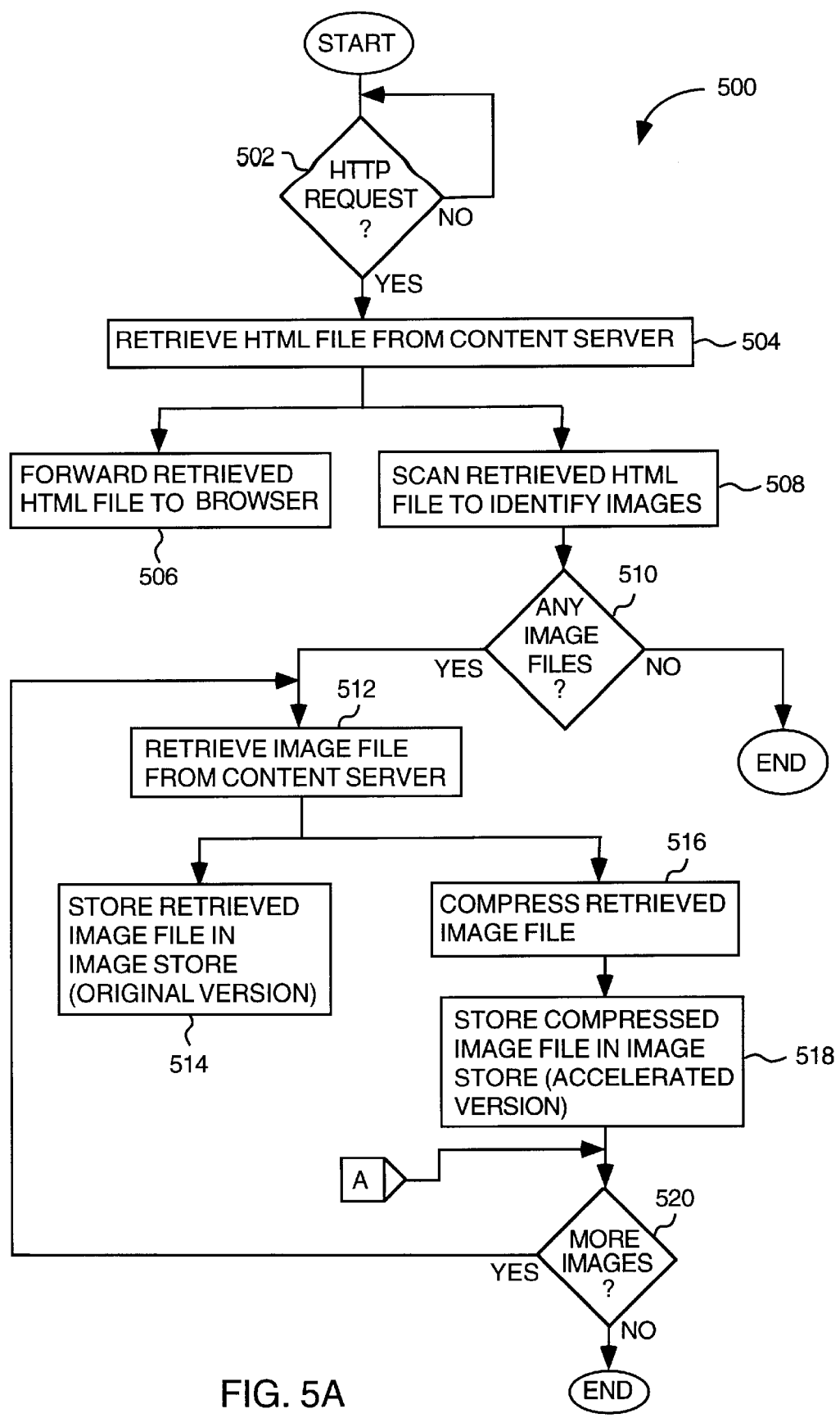
FIG. 5A is a flow diagram of HTTP request processing according to an embodiment of the invention.

The processing performed by a proxy system according to the invention is described in FIGS. 5A and 5B as follows. FIG. 5A is a flow diagram of HTTP request processing 500 according to an embodiment of the invention. The HTTP request processing 500 is, for example, performed by the proxy server 102 illustrated in FIG. 1 or the proxy server 202 illustrated in FIG. 2.

The HTTP request processing 500 initially begins with a decision block 502 that determines whether a HTTP request has been received. The decision block 502 causes the HTTP request processing 500 to wait until it receives a HTTP request from a browser. Stated differently, the HTTP request processing 500 begins when a HTTP request has been received at a proxy server from a browser.

Once an HTTP request has been received, an HTML file associated with the HTTP request is retrieved 504 from a content server via the Internet 106. Next, the retrieved HTML file is forwarded 506 to the browser that issued the HTTP request. In one embodiment, the proxy server 102, 202 can perform the forwarding operation. Simultaneous with the forwarding 506, the retrieved HTML file is also scanned 508 to identify image file references embedded in the HTML file. The embedding of image file references within an HTML file is commonplace for providing graphical images as part of a web page. In one embodiment, the observer 210 of the accelerator server 204 can perform the scanning operation.

Following block 508, a decision block 510 determines whether any image file references were identified. When no image file references were identified by the scanning operation, then the HTTP request processing 500 is complete and ends for this particular HTTP request and no acceleration is provided by the proxy system.

On the other hand, when image file references are identified within the retrieved HTML file, the HTTP request processing 500 continues. Namely, one of the identified image files is retrieved 512 from a content server via the Internet. Then, the retrieved image file is stored 514 in an image store. Here, the retrieved file being stored in the image store is an original version of the image file. Simultaneously, the retrieved image file is compressed 516. A variety of different techniques can be used to compress or otherwise reduce the file size of an image file. In one embodiment, the compression of the retrieved image file would be performed by an accelerator such as the accelerator 218 illustrated in FIG. 2. Following block 516, the compressed image file is stored 518 in the image store. Here, the image file being stored in the image store is an accelerated version of the retrieved image file. In one embodiment, the image store is the image store 214 illustrated in FIG. 2.

Next, a decision block 510 determines whether there are additional images that have been identified by the scanning operation. If there are additional images, the HTTP request processing 500 returns to complete blocks 512 through 518 for each of the additional images. On the other hand, once all the images that were identified by the scanning operation have been processed, then the HTTP request processing 500 is complete and ends. However, it should be recognized that once another HTTP request is identified, the HTTP request processing 500 will begin again from the beginning.

Figure 5B:
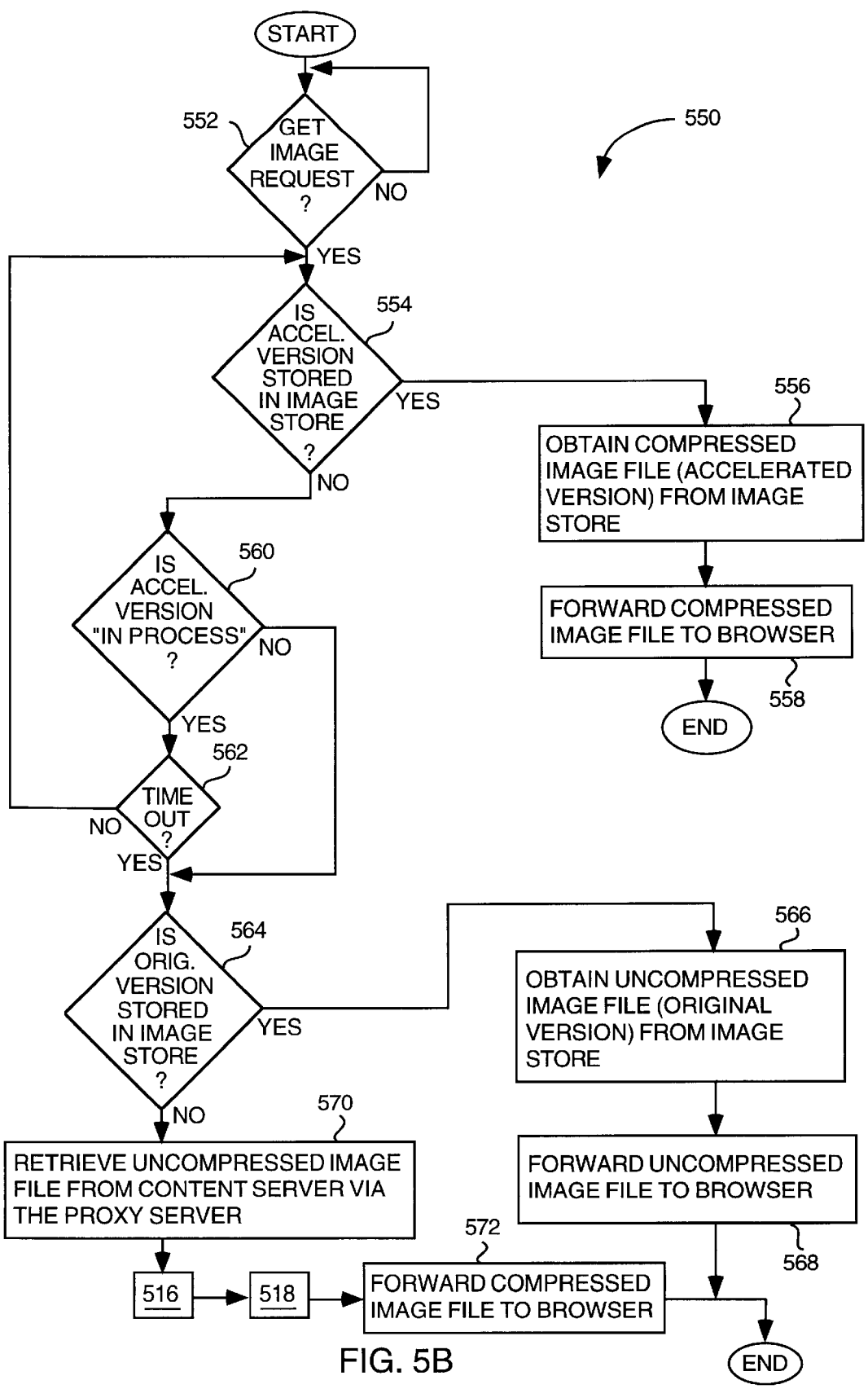
FIG. 5B is a flow diagram of get image processing according to an embodiment of the invention.

FIG. 5B is a flow diagram of get image processing 550 according to an embodiment of the invention. The get image processing 550 is, for example, performed by the proxy server 102 illustrated in FIG. 1 or the proxy server 202 illustrated in FIG. 2.

The get image processing 550 begins with a decision block 552 that determines whether a get image request has been received. The decision block 552 causes the get image processing 550 to wait until a get image request has been received from a browser. In other words, the get image processing 550 begins when the proxy server receives a get image request from a browser.

Once a get image has been received, a decision block 554 determines whether an accelerated version of the requested image is stored in the image store. When an accelerated version is stored in an image store, the compressed image file associated with the image request is obtained 556 from the image store. Here, the compressed image file is the accelerated version of the requested image. Next, the compressed image file is forwarded 558 to the requesting browser. Following block 558, the get image processing 550 for a particular get image request is complete and ends. Here, the get image request by a browser is rapidly satisfied by a proxy system because an accelerated version of the requested image was immediately available from the image store.

On the other hand, when the decision block 554 determines that an accelerated version of the requested image is not stored in the image store, then a decision block 560 determines whether an accelerated version of the requested image is currently "in process." When an accelerated version is "in process," it means that the image is currently undergoing processing to produce the accelerated version of the image. Also, when an accelerated version is "in process," it also means that the proxy system expects to shortly be able to provide an accelerated version of the requested image. Nevertheless, when the decision block 560 is determined to be "in process," a decision block 562 determines whether a time out has occurred. If a time out has occurred, then the proxy system has made an executive decision not to wait any additional time for the production of the accelerated version to complete. However, if a time out has not occurred, then the processing returns to decision block 554 and subsequent blocks until the accelerated version becomes available or a time out has occurred. Also, when the decision block 560 determines that there is no accelerated version even "in process," then the decision block 562 is bypassed.

In any case, following a time out or otherwise following the failure to obtain an accelerated version of the requested image, the get image processing 550 continues. Namely, a decision block 564 determines whether there is an original version of the requested image stored in the image store. If an original version of the requested image is stored in an image store, then the uncompressed file for the requested image is obtained 566 from the image store. Here, the uncompressed file that is retrieved from the image store represents an original version of the requested image. In other words, the original version is associated with an unaccelerated version of the image file and would, therefore, have a greater file size than would an accelerated version if one would have been available. Even so, given that the original version of the image is available from the image store, it can be supplied to the browser with an improved response time because the proxy system does not need to first retrieve the file from the content server via the Internet. Following block 566, the uncompressed image file that has been obtained is forwarded 568 to the requesting browser. After forwarding the uncompressed image file to the browser, the get image processing 550 is complete and ends.

Alternatively, when the decision block 564 determines that there is no original version stored in an image store, then the get image processing 550 operates to retrieve the uncompressed image file associated with the get image request from a content server via the proxy server and the Internet. Here, when the proxy system lacks storage of any useable versions of the requested image, then the get image processing 550 retrieves the requested image from the content server via the Internet. Following block 570, when the decision block 564 determines that there is no original version stored in an image store, then presumably no previous attempt has been made to retrieved the requested image file and to produce an accelerated version therefor. Accordingly, following block 570, the blocks 516 and 518 are performed to compress the retrieved image file from the content server and then store the retrieved image file in the image store. Next, in block 572, the compressed image file is forwarded to the browser. Hence, instead of simply forwarding the uncompressed image file to the browser, the get image processing 550 operates to produce an accelerated version (e.g., compressed) that can be forwarded to the browser significantly faster than could the original version (e.g., uncompressed). Following block 572, the get image processing 550 is complete and ends.

The HTTP request processing 500 illustrated in FIG. 5A provides for improved response times to users of browsers. FIGS. 6A–6D represent additional features that could be provided with the HTTP request processing 500.

Figure 6A:
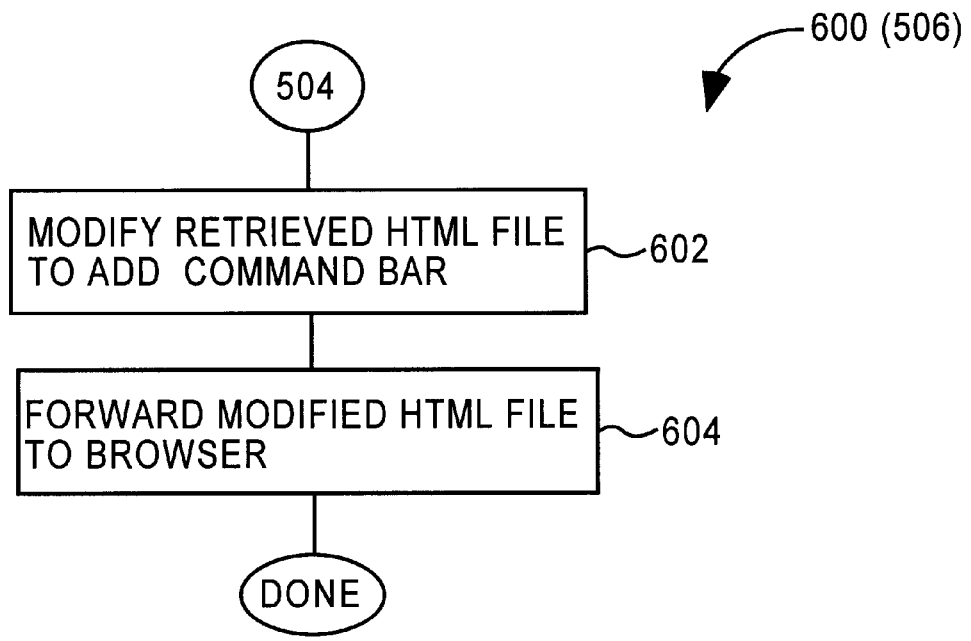
FIG. 6A is a flow diagram of command bar processing according to an embodiment of the invention.

In FIG. 6A, command bar processing 600 is described. The command bar processing 600 adds a command bar to a HTML file that is displayed on a display device by the browser. The command bar processing 600 can be performed by the block 506 of the HTTP request processing 500 illustrated in FIG. 5A. Namely, once the HTML file is retrieved from the content server in block 504, the retrieved HTML file can be modified 602 to add a command bar. Here, the command bar is typically added to the HTML file to allow a user to designate either what type of accelerated version is preferred or to issue a request for an original version of the image when previously an accelerated version was provided. Following block 602, the modified HTML file is forwarded 604 to the browser. Following block 604, the command bar processing 600 is complete and ends.

Figure 7:
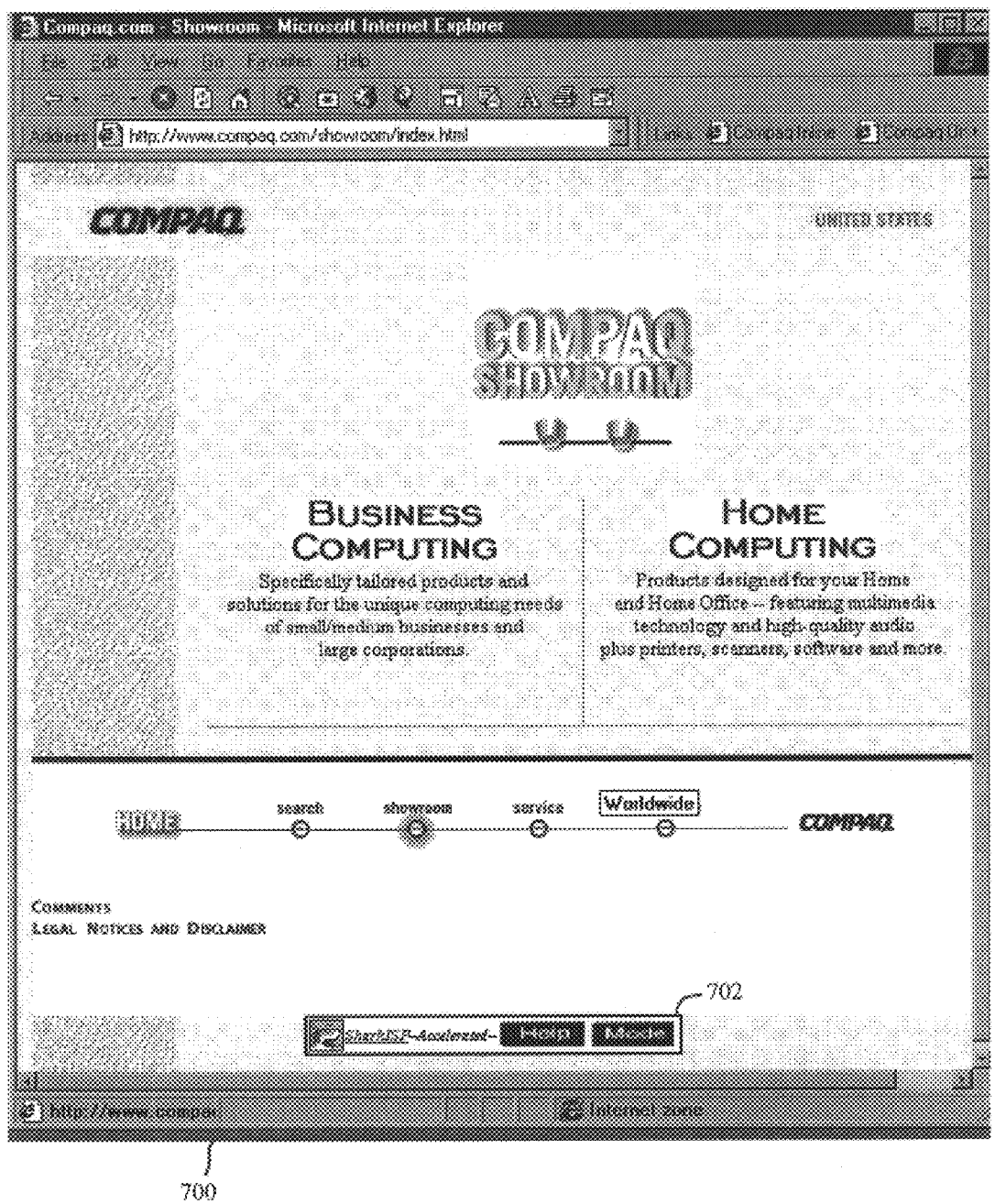
FIG. 7 illustrates a representative displayed web page in accordance with a retrieved HTML file that was modified to include a command bar according to an embodiment of the invention.

FIG. 7 illustrates a representative displayed web page 700 in accordance with a retrieved HTML file that was modified to include a command bar 702. Although the command bar 702 is shown as placed in the bottom portion of the web page 700, the command bar 702 can be placed anywhere on the web page 700. The command bar 702 includes an identification of a proxy server (e.g., SharkISP), indication of whether displayed content is accelerated version (mode) or not, a mode button ("Mode") to toggle between accelerated mode and unaccelerated mode, and a help button ("Help"). As illustrated in FIG. 7, the displayed content is accelerated according to the command bar 702. Upon a user's selection of the Mode button, the content would be redisplayed in an unaccelerated manner (after requesting and receiving the unaccelerated version of the content). The command bar 702 is merely a representative command bar and those skilled in the art will recognize that a wide variety of command bars can be used in providing a user with not only information as to whether displayed content is accelerated or not but also a mechanism to allow a user to choose to have the either accelerated or unaccelerated content displayed.

Figure 6B:
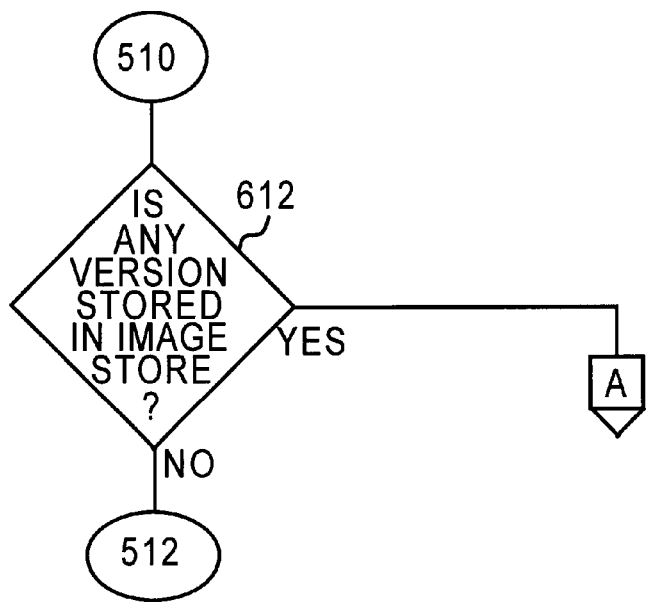
FIG. 6B is an efficiency enhancement that can be added to the HTTP request processing illustrated in FIG. 5A.

FIG. 6B is an efficiency enhancement 610 that can be added to the HTTP request processing 500. Specifically, between blocks 510 and 512, the HTTP request processing 500 could additionally provide a decision block 612. The decision block 612 determines whether there are any versions for the requested images stored in the image store. If so, then the HTTP request processing 500 can bypass blocks 512–518 and thus avoid time consuming processing because the requested image has previously been stored in the image store. Hence, in such a situation, it would have been previously determined whether an accelerated version of the requested image was advantageous and, if so, it would have been stored to the image store together with the original version. Therefore, the requested image in this case would be available from the image store as at least the original version and possibly also an accelerated version. Blocks 516 and 518 could also still be utilized in some instances to again attempt to produce an accelerated version or to attempt to produce a different accelerated version.

Following the decision block 612 when there are no versions of the requested image already stored in the image store, then the HTTP request processing 500 would continue with block 512 and subsequent blocks.

Figure 6C:
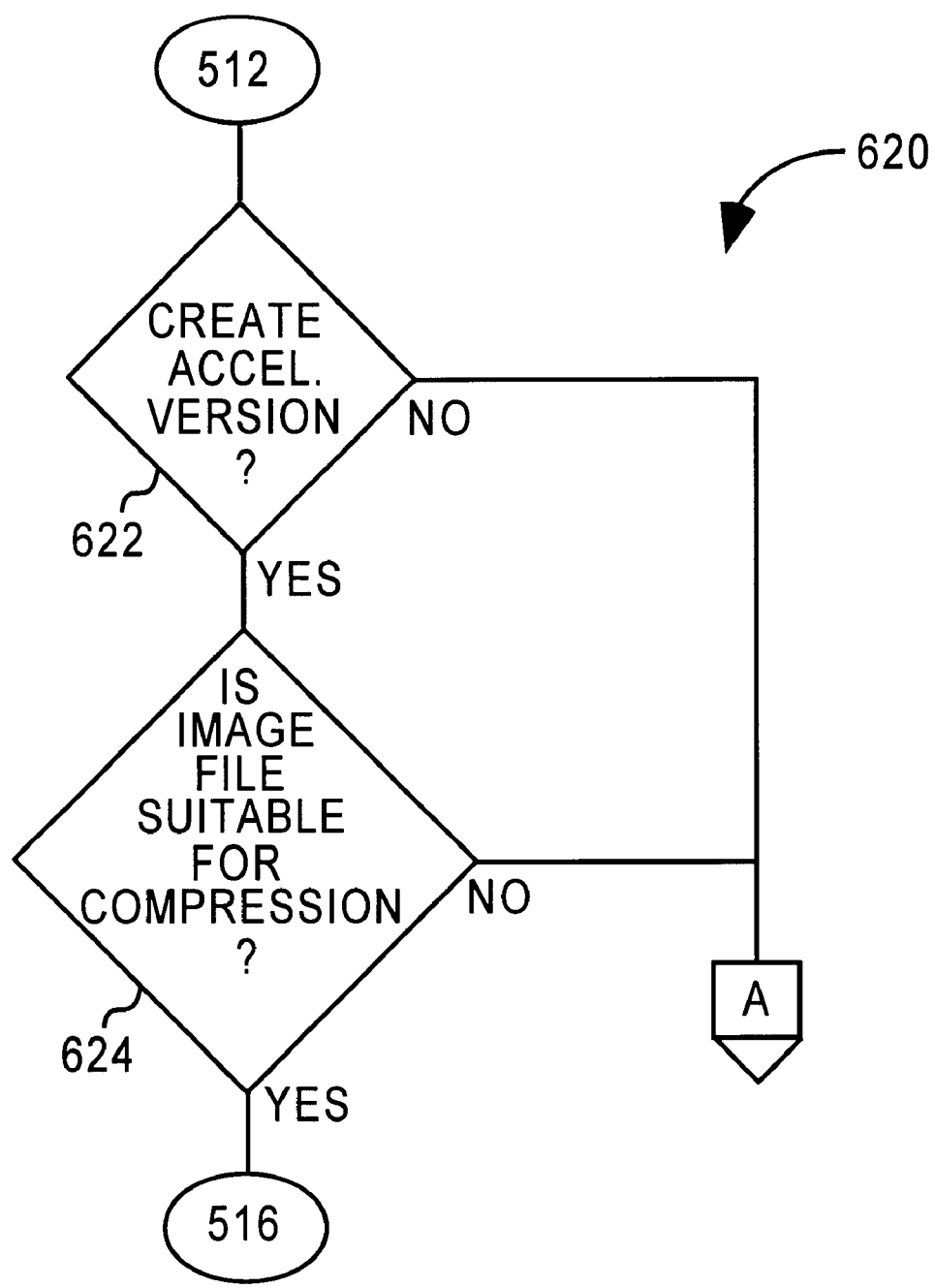
FIG. 6C is a flow diagram of an efficiency enhancement processing for the HTTP request processing illustrated in FIG. 5A.

FIG. 6C is a flow diagram of an efficiency enhancement processing 620 for the HTTP request processing 500. In particular, between the blocks 512 and 516 of the HTTP request processing 500, additional processing operations can be provided to further enhance the efficiency with which proxy server operates according to the invention. Namely, following block 512, a decision block 622 can determine whether an accelerated version should be created. Here, using a user configuration, user preference, system load monitoring criteria and the like, the proxy system can determine whether an accelerated version of the requested image should be obtained. If the decision block 622 determines that an accelerated version of the requested version should not be created, then the HTTP request processing 500 will operate to bypass blocks 516 and 518 so that an accelerated version is not produced. On the other hand, when decision block 622 determines that an accelerated version should be created, a decision block 624 determines whether the image file for the requested image is suitable for compression. In other words, some image files cannot be compressed in an efficient manner or to a significant extent such that the processing time and load on the system is determined to outweigh any beneficial advantages that would be obtained from an accelerated version of the image file. In such a case, the HTTP request processing 500 would skip blocks 516 and 518 so that an accelerated version of the requested image is not created and stored despite the fact that the user configuration, user preference, or system load monitoring criteria indicate that an accelerated version of the requested image should be obtained. On the other hand, when decision block 624 determines that the image file for the requested image is suitable for compression, the HTTP request processing 500 continues with blocks 516 and 528 so that the compressed image file is obtained and stored in image store.

Figure 6D:
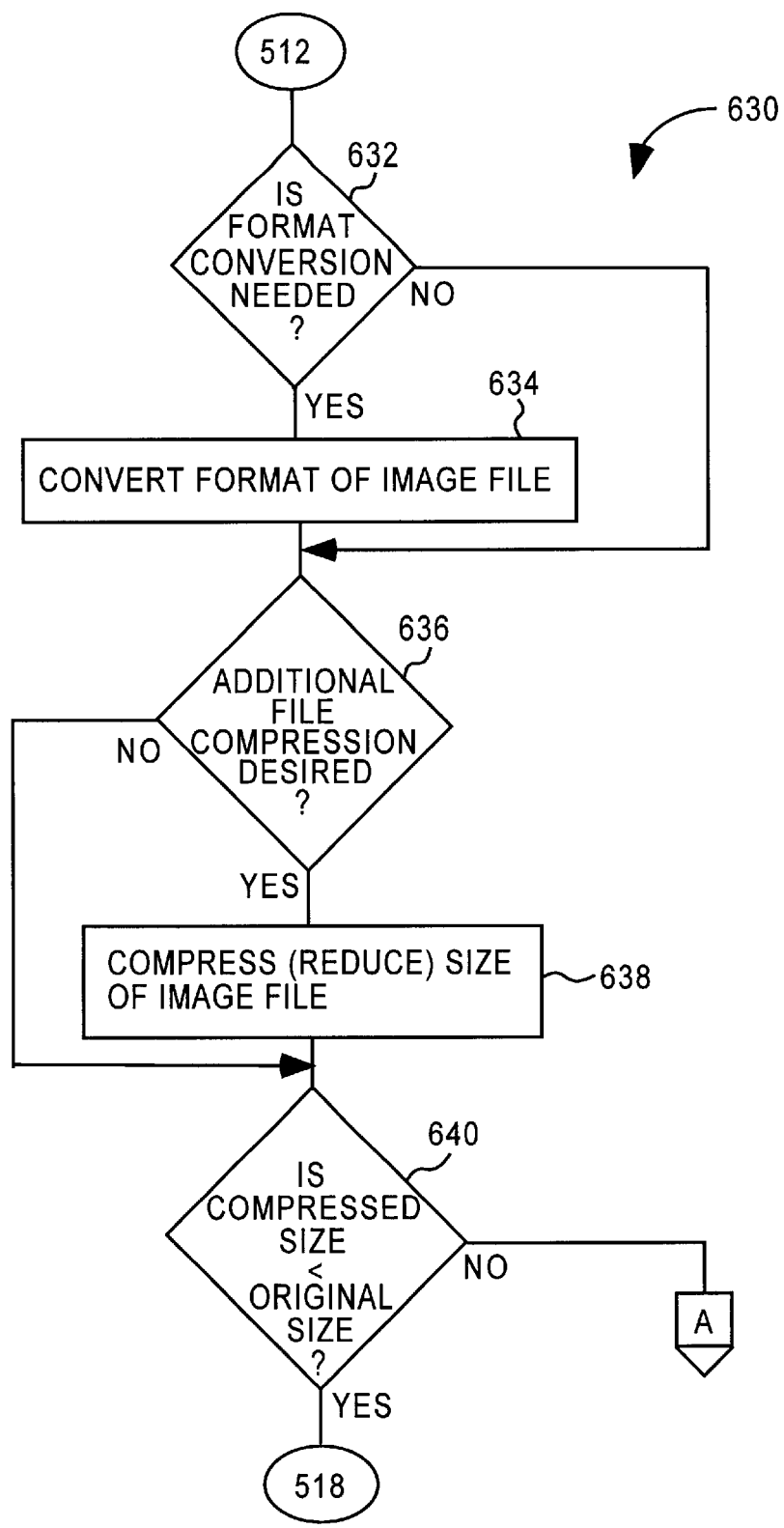
FIG. 6D is a flow diagram of acceleration processing according to an embodiment of the invention.

FIG. 6D is a flow diagram of acceleration processing 630 according to an embodiment of the invention. The acceleration processing 630 replaces the blocks 516 and 518 of the HTTP request processing 500 illustrated in FIG. 5A.

The acceleration processing 630 begins with a decision block 632 that determines whether format conversion is needed. When format conversion is needed, then the format of the image file is converted 634. Here, the conversion of the format of the image file provides some compression or reduction in size to the image file. As one example, an image file in a GIF format would be converted to a JPEG format because JPEG is normally a more efficient format. On the other hand, when the decision block 632 determines that format conversion is not needed, then the block 634 is bypassed. Following block 634, a decision block 636 determines whether additional file compression is desired. When the decision block 636 determines that additional file compression is desired, then the size of the image file is compressed (reduced) 638. The compression or reduction in the size of the image file can be achieve in a variety of ways, including recompression, color quantization, animation reduction, etc. On the other hand, when the decision block 636 determines that additional file compression is not desired, then the block 638 is bypassed.

As noted above, the producing of accelerated versions of images can instead first convert images to a raw format. In such a case, block 634 would convert the format of the image file to the raw format. For example, if the image file had a JPEG format, the image file would be converted to the raw format in block 634. The decision block 632 would allow the bypassing of the block 634 if the format conversion to the raw format were not needed. For example, in converting from animated GIF to reduced animated GIF, the conversion to raw format would be avoided. Thereafter, the compression or reduction in the file size of the image file is performed in block 638, unless bypassed by block 636. Again, the compression or reduction in the size of the image file can be achieve in a variety of ways, including recompression, color quantization, animation reduction, etc.

Next, in either case, a decision block 640 determines whether the compressed size of the image file is less than the original size of the image file. If the decision block 640 determines that the compressed size of the image file is less than the original size of the image file, then the HTTP request processing 500 continues with block 518 where the compressed image file is stored in the image store. On the other hand, when the decision block 640 determines that the compressed size of the image file is not less than the original size of the image file, then the acceleration processing was not advantageous and as a result the compressed image file is not stored in the image store because the block 518 of the HTTP request processing 500 is bypassed.

The advantages of the invention are numerous. One advantage of the invention is that substantial performance gains in responsiveness and bandwidth utilization are achieved with the invention. Another advantage of the invention is that accelerated versions of content information are produced and cached locally so that content servers need not concern themselves with offering and supporting multiple versions of the content provided on their content servers. Yet another advantage is that initial requests for content not yet cached locally may also be provided with improved responsiveness.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A proxy system for distributing data objects, comprising:
   a proxy server, said proxy server operates to receive from a network browser an object request for a requested object and to manage the forwarding of the requested object to the network browser, said proxy server being connected to a network, and the requested object is accessible by said proxy server via the network; and
   an acceleration unit coupled to said proxy server, said acceleration unit being connected to the network, said acceleration unit operates to identify the requested object, pre-fetch the requested object having an original size from a content provider coupled to the network, reduce the size of the retrieved object to a reduced size, and provide the requested object with the reduced size to said proxy server; and
   said acceleration unit comprises:
      an observer, said observer operates to review the object request to determine whether the requested object is likely capable of being accelerated by said acceleration unit;
      an object manager operatively coupled to said observer, said object manager operates to manage the retrieval of the requested object having the original size from the content provider via the network, and to examine the requested object to determine whether acceleration would be advisable;
      an accelerator operatively coupled to said object manager, said accelerator operates when acceleration has been determined to be advisable to receive the requested object having the original size from said object manager and then to reduce the size of the requested object with the original size so as to produce the requested object with the reduced size; and
      an object store operatively coupled to said accelerator and said object manager, said object store operates to store at least the requested object with the reduced size.

2. A system as recited in claim 1, wherein when the requested object with the reduced size is determined not to be available from said acceleration unit for more than a determined period of time, said proxy server obtains the requested object of the original size from said acceleration unit and provides the requested object having the original size to the network browser.

3. A system as recited in claim 1, wherein by pre-fetching the requested object, said acceleration unit is able to retrieve the requested object from the content server faster than said proxy server.

4. A system as recited in claim 1, wherein the requested object is an image file.

5. A system as recited in claim 4, wherein the image file with the reduced size has a JPEG format.

6. A system as recited in claim 4, wherein said accelerator comprises an image reduction processor that reduces the size of the image file from the original size to the reduced size.

7. A system as recited in claim 6,
wherein said image reduction processor comprises:
a format converter that converts the format of an image file from a first format to a second format; and
a compression unit that compresses an image file,
wherein at least one of said format converter and said compression unit operate on the image file to reduce the size of the image file.

8. A system as recited in claim 7, wherein said format converter converts the format of an image file from a GIF format to a JPEG format.

9. A system as recited in claim 8, wherein the JPEG format is a progressive JPEG format.

10. A system as recited in claim 8, wherein said format converter converts an image file from a non-progressive JPEG format to a progressive JPEG format.

11. A system as recited in claim 7, wherein said compression unit reduces the size of the image file by reducing color or resolution quality of the image file.

12. A system as recited in claim 1, wherein the network browser is an Internet browser.

13. A system as recited in claim 1, wherein said acceleration unit further comprises:
object store manager operatively coupled to said object store and said object manager, said object store manager operates to manage the retrieval of the objects from said proxy server.

14. A system as recited in claim 13, wherein said proxy server together with said object store manager determine whether the requested object with the reduced size is already available from said object store, and when available operate to deliver the requested object with the reduced size to supply the requested object with the reduced size to said proxy server while avoiding operations by said observer, said object manager and said accelerator.

15. A system as recited in claim 1,
wherein said proxy server supports multiple network browsers, and
wherein said acceleration unit comprises:
an observer, said observer operates to review the object request to determine whether the requested object is likely capable of being accelerated by said acceleration unit;
at least one object manager operatively coupled to said observer, a selected one of said object managers operates to manage the retrieval of the requested object having the original size from the content provider via the network, and to examine the requested object to determine whether acceleration would be advisable;
at least one accelerator operatively coupled to said at least one object manager, a selected one of said accelerators operates when acceleration has been determined to be advisable to receive the requested object having the original size from said object manager and then to reduce the size of the requested object with the original size so as to produce the requested object with the reduced size; and
an object store operatively coupled to said at least one accelerator and at least one object manager, said object store operates to store at least the requested object with the reduced size.

16. A system as recited in claim 15, wherein said system further comprises:
a resource manager that manages system configuration information for at least said at least one accelerator and said at least one object manager.

17. A system as recited in claim 16, wherein said system further comprises:
a first load balancer that operates to select the one of said object managers to retrieve the requested object having the original size from the content provider via the second connection to the network and to examine the requested object to determine whether acceleration would be advisable; and
a second load balancer that operates to select the one of said accelerators to reduce the size of the requested object with the original size to produce the requested object with the reduced size.

18. A system as recited in claim 15, wherein the requested object is an image file.

19. A system as recited in claim 18,
wherein said acceleration unit further comprises:
image store manager operatively coupled to said object store and said object manager, said image store manager operates to manage the storage of the image files in said object store, and
wherein said proxy server together with said image store manager determine whether the requested image file with the reduced size is already available from said object store, and when available operate to deliver the requested image file with the reduced size to said proxy server while avoiding operations by said observer, said object manager and said accelerator.

20. A proxy system for retrieval of image files over a network, said proxy system comprising:
an image cache memory for storing image files that have previously been requested over the network;
a proxy server operatively coupled to said image cache memory and the network, said proxy server operates to receive an image file request from a network browser and to manage the forwarding of the requested image file to the network browser; and
an acceleration unit coupled to said proxy server, said image cache memory and the network, said acceleration unit includes at least:
an observer, said observer operates to identify the requested image files received by said proxy server;
an image manager operatively coupled to said observer, said image manager operates to retrieve the requested image file having an original size from the content provider via the network, and to examine the requested image file to determine whether acceleration would be advisable; and an accelerator operatively coupled to said image manager, said accelerator operates when acceleration has been determined to be advisable to receive the requested image file having the original size from said image manager and then to reduce the size of the requested image file with the original size so as to produce the requested image file with the reduced size, and thereafter causing the requested image file with the reduced size to be stored to said image cache memory.

21. A system as recited in claim 20, wherein said image cache memory operates to store the requested image with the original size and the requested image with the reduced size.

22. A system as recited in claim 21, wherein concurrently with said accelerator producing the requested image file with the reduced size, said image manager stores the requested image file having the original size to said image cache memory.

23. A system as recited in claim 20, wherein said proxy server determines whether the requested image file is already stored in said image cache memory, and when the requested image file is already stored in said image cache memory, the requested image file is forwarded to the network browser from said image cache memory and processing by said acceleration unit is bypassed.

24. An acceleration apparatus for producing accelerating versions of objects, said acceleration apparatus comprising:

an object manager, said object manager operates to retrieve a requested object having an original size from a remotely located computer over a network, and to examine the requested object to determine whether acceleration would be advisable; and an accelerator operatively coupled to said object manager, said accelerator operates when acceleration has been determined to be advisable to receive the requested object having the original size from said object manager and then to reduce the size of the requested object with the original size so as to produce the requested object with the reduced size, and thereafter causing the requested object with the reduced size to be supplied to a requestor of the requested object.

25. An acceleration apparatus as recited in claim 24, wherein the requested object is an image file.

26. A system as recited in claim 25, wherein the image file with the reduced size has a JPEG format regardless of the format of the requested image file with the original size.

27. An acceleration apparatus as recited in claim 24, wherein said acceleration apparatus further comprises:

an object store operatively coupled to said accelerator and said object manager, said object store operates to store at least the requested object with the reduced size.

28. A system as recited in claim 27, wherein said accelerator comprises an image reduction means for reducing the size of the image file from the original size to the reduced size.

* * * * *